United States Patent
Kadowaki et al.

[11] Patent Number: 5,600,679
[45] Date of Patent: Feb. 4, 1997

[54] BURST SIGNAL RECEIVING APPARATUS WITH DIFFERENT HOLDING TIMES OF THRESHOLD SIGNAL

[75] Inventors: Makoto Kadowaki, Tokyo; Kunimitsu Kurita, Shizuoka, both of Japan

[73] Assignee: NEC Corporation, Tokyo, Japan

[21] Appl. No.: 617,408

[22] Filed: Mar. 18, 1996

[30] Foreign Application Priority Data

Mar. 28, 1995 [JP] Japan ..................... 7-069220

[51] Int. Cl.$^6$ ................................. H04L 25/06
[52] U.S. Cl. ........................... 375/317; 348/405
[58] Field of Search ................ 370/100.1; 364/487; 348/405; 375/317

[56] References Cited

U.S. PATENT DOCUMENTS

| | | | |
|---|---|---|---|
| 4,501,022 | 2/1985 | Oswald | 455/601 |
| 4,520,480 | 5/1985 | Kawai | 370/100 |
| 4,686,709 | 8/1987 | Nawaki | 455/613 |
| 4,769,760 | 9/1988 | Kroll | 364/487 |
| 5,014,231 | 5/1991 | Reinhardt | 364/718 |
| 5,134,632 | 7/1992 | Fletcher | 375/22 |
| 5,461,422 | 10/1995 | Hsieh | 348/405 |

*Primary Examiner*—Stephen Chin
*Assistant Examiner*—Mohammad Ghayour
*Attorney, Agent, or Firm*—Young & Thompson

[57] ABSTRACT

In receiving an optical digital burst signal in an optical communication system, an optical digital burst signal is converted into an electric digital burst signal. A threshold level is determined from the electric digital burst signal. Based on a threshold signal having the determined threshold level whether each of bits of the electric digital burst signal is in a high level or a low level is identified by an identifying circuit. When a sync pattern is detected from the electric digital burst signal, a hunting signal is generated by a synchronization detecting circuit. The duration time of the threshold signal is selected as one of short and long duration times based on whether the hunting signal is significant or insignificant.

19 Claims, 2 Drawing Sheets

BURST SIGNAL RECEIVING APPARATUS WITH DIFFERENT HOLDING TIMES OF THRESHOLD SIGNAL

BACKGROUND OF THE INVENTION

1. Field of the Invention

The present invention relates to a burst signal receiving apparatus, and more particularly, to a burst signal receiving apparatus in a optical digital transmission system.

2. Description of Related Art

FIG. 1 is a block diagram illustrating a conventional burst signal receiving apparatus in an optical digital transmission system. An optical digital burst signal 122 is supplied from an optical transmission line (not shown) of a station via an input terminal 120. The optical digital burst signal 122 is composed of frames carrying data transmitted from other stations. Each of the frames of fixed length includes a plurality of bits and is composed of a head bit pattern, a sync bit pattern and a data bit pattern indicative of the data. The optical digital burst signal 122 is converted into an electric digital burst signal 124 by an optical signal—electric signal (O/E) converter 111. An automatic threshold control (ATC) circuit 116 receives the electric digital burst signal 124 from the O/E converter 112 to detect a peak level and bottom level of the burst signal 124 and calculates an average value of the peak level and the bottom level to output to an identifying circuit 112 as a DC threshold voltage 126. The identifying circuit 112 receives the electric digital burst signal 124 from the O/E converter 111 and the DC threshold voltage 126 from the ATC circuit 116 and uses the threshold voltage 126 to identify the level of each of bits of the burst signal 124 to produce a digital burst signal 128 which is outputted to an output terminal 130. A clock signal generating circuit 113 generates a clock signal 132 in synchronous with the digital burst signal 128. The clock signal 132 is used in the apparatus and supplied to a synchronization detecting circuit 114 and a counter 115. The synchronization detecting circuit 114 detects a sync pattern of the burst signal from the digital burst signal 128 outputted from the identifying circuit 112 in synchronous with the clock signal 132 to output the detecting result to an output terminal 140 as a sync information 136. Also, the detecting circuit 114 outputs a hunting information 134 indicative of establishment of synchronization to the counter 115 if the sync pattern is once detected. The counter 115 is initialized in response to the sync information 136 and counts the clock pulses of clock signal 132 to output the count to an output terminal 150 as a count information.

More particularly, in a case where an optical digital communication system includes a parent station and a plurality of child stations and one way transmission is carried out between one parent station and a plurality of child stations via a star coupler, a downstream signal transmitted from the parent station to the plurality of child stations is transmitted in serial intermittently with a predetermined time interval. The burst signal is received by the burst signal receiving apparatus in each of the plurality of child stations. Because transmission path lengths from the parent station to the plurality of child stations are different from each other, the received signal level of the burst signal in one child station are different from that in another child station by a difference in transmission loss due to the difference in the transmission path length. The components of the burst signal receiving apparatus shown in FIG. 1 operate in the same manner in each child station. That is, the identifying circuit 112 is required to reliably identify the "1" or "0" level of each bit of the digital burst signal 124 even if the burst signal is transmitted though a long optical transmission path after the star coupler. For this reason, the ATC circuit 116 detects the peak level and bottom level of the digital burst signal 124 to automatically determine the threshold voltage 126 as the average voltage of these levels. For instance, if the threshold voltage 126 is low, a noise level is erroneously detected as the "1" level of the burst signal. On the other hand, if the threshold voltage is high, the peak level of the burst signal 124 transmitted from the child station having the longest transmission path length from the parent station is lower than the threshold voltage, so that it would be impossible to identify the high signal level of the burst signal 124 in the farthest child station. Accordingly, the threshold voltage level is actually determined to satisfy the above two conditions. Further, transmission loss of the transmission path changes as temperature change other than the difference of transmission path length and the signal level of the burst signal also changes due to the transmission loss. However, since change of seasons is a major factor in the transmission loss change of the transmission path by temperature change, the signal level change of the burst signal is so gentle that it is readily possible to automatically change the threshold voltage in accordance with the signal level change of the burst signal.

In the conventional burst signal receiving apparatus, the signal level identification of the burst signal can be easily performed in each of the plurality of child stations in a case of one way transmission from the parent station to the plurality of child stations. However, in a case of bidirectional transmission between the parent station and the plurality of child stations, the signal levels of the burst signals transmitted from the plurality of child stations to the parent station are different from each other by the transmission loss differences due to the differences of the transmission path lengths. In the worst case, there would be a case where a burst signal having the lowest peak level is received via the longest transmission path just after a burst signal having the highest peak level is received via the shortest transmission path. In such a case, since the threshold voltage is kept at a value determined based on the relatively high peak level, when the burst signal having the relatively low peak level is suddenly received, the burst signal receiving apparatus cannot track the level change in the peak level of the burst signal. If the threshold voltage is higher than the relatively low peak level of the burst signal, the identifying circuit 112 cannot identify the signal level of "1" of the burst signal having the relatively low peak level.

SUMMARY OF THE INVENTION

The present invention has, as an object, to provide a method and apparatus for correctly receiving a digital burst signal.

Another object of the present invention is to provide a method and apparatus for receiving a digital signal, wherein a duration time of a threshold signal can be selected.

Still another object of the present invention is to provide a method and apparatus for receiving a digital signal, wherein a threshold voltage level can be determined for every frame of the burst signal.

In order to achieve an aspect of the present invention, a digital burst signal receiving apparatus, includes an identifying circuit for identifying based on a supplied threshold signal whether each of bits of a received digital burst signal is in a high level or a low level, a synchronization detecting circuit for detecting a sync pattern from the digital burst signal identified by the identifying circuit to produce a hunting signal, and an automatic threshold control section for supplying to the identifying circuit the threshold signal indicative of a threshold level which is determined from the received digital burst signal and having one of first and second duration times which is selected based on whether the hunting signal is significant or insignificant, the first duration time being longer than the second duration time.

The first and second duration times are predetermined. To the identifying circuit is supplied the threshold signal having the first duration time when the hunting signal is insignificant and the threshold signal having the second duration time when the hunting signal is significant. In a case that the digital burst signal is composed of at least one frame which is composed of a plurality of bits, each frame including a head pattern, the sync pattern and a data pattern, the first duration time is a time interval of one bit and the second duration time is a time interval of one frame. The synchronization detecting section holds the hunting signal in a significant state even if the sync pattern is not detected in at least two continuous frames. As a result, the threshold signal can be held even in such a case.

The apparatus may further includes a resetting section for resetting the automatic threshold control section such that a new threshold signal determined based on a predetermined offset level is supplied to the identifying circuit. More particularly, the resetting section includes a counter for counting the number of bits of the digital burst signal identified by the identifying circuit after the sync pattern is detected by the synchronization detecting section and generating a reset signal when the count reaches a predetermined value, and a signal generating section for generating a threshold signal resetting signal in response to the reset signal from the counter when the hunting signal is in the significant state. Thereby, the automatic threshold control section determines the threshold level of the threshold signal based on a predetermined offset level by receiving the burst signal for a predetermined time interval in response to the threshold signal resetting signal from the signal generating section and holds the threshold signal indicative of the determined threshold level for a duration time determined in accordance with whether the hunting signal is significant or insignificant.

In order to achieve another aspect of the present invention, a method of receiving an optical digital burst signal in an optical communication system, comprising the steps of:

converting an optical digital burst signal into an electric digital burst signal;

determining a threshold level from the electric digital burst signal;

identifying based on a threshold signal having the determined threshold level whether each of bits of the electric digital burst signal is in a high level or a low level;

detecting a sync pattern from the electric digital burst signal to produce a hunting signal; and selecting one of first and second duration times as a duration time of the threshold signal based on whether the hunting signal is significant or insignificant, the first duration time being longer than the second duration time.

In order to achieve still another aspect of the present invention, an apparatus for receiving a digital burst signal composed of frames each of which is composed of a plurality of bits and includes a head pattern, a sync pattern and a data pattern, includes an identifying circuit for identifying based on a supplied threshold signal whether each of bits of a received digital burst signal is in a high level or a low level, and a threshold signal control section for determining a threshold level from the received digital burst signal and supplying to the identifying circuit the threshold signal indicative of the determined threshold level and for holding the threshold signal for a first duration time when any sync pattern is detected, and for a second duration time after a sync pattern is detected in a frame until the next frame is received, the first duration time being longer than the second duration time.

DESCRIPTION OF THE PREFERRED EMBODIMENTS

The burst signal receiving apparatus in an optical digital transmission system according the embodiment of the present invention will be described below in detail with reference to the accompanying drawings. The optical digital transmission system includes a parent station and a plurality of child stations, which are not shown, and each of the stations includes the same burst signal receiving apparatus.

Figure 1:
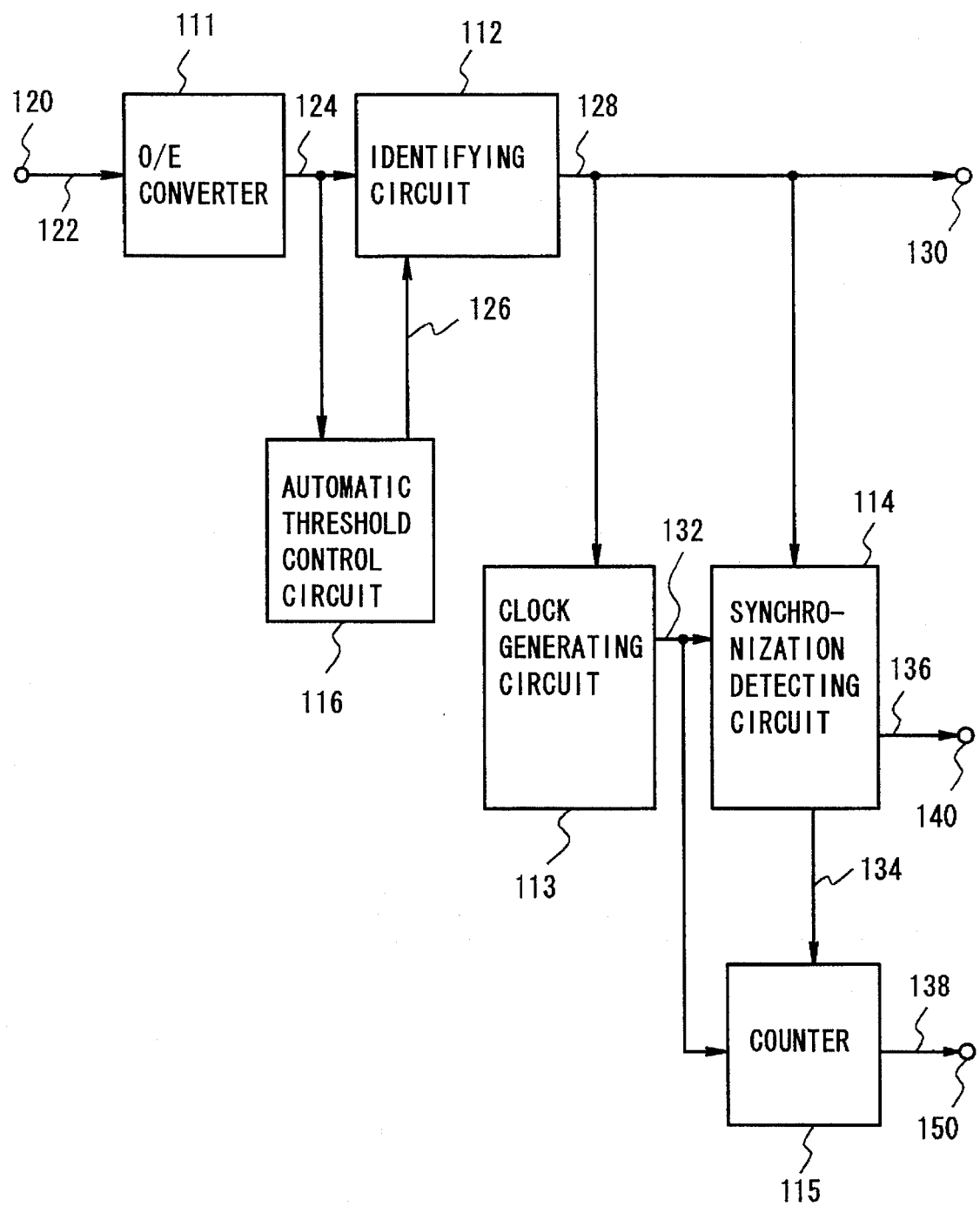
FIG. 1 is a block diagram illustrating a conventional burst signal receiving apparatus in an optical digital transmission system.
Figure 2:
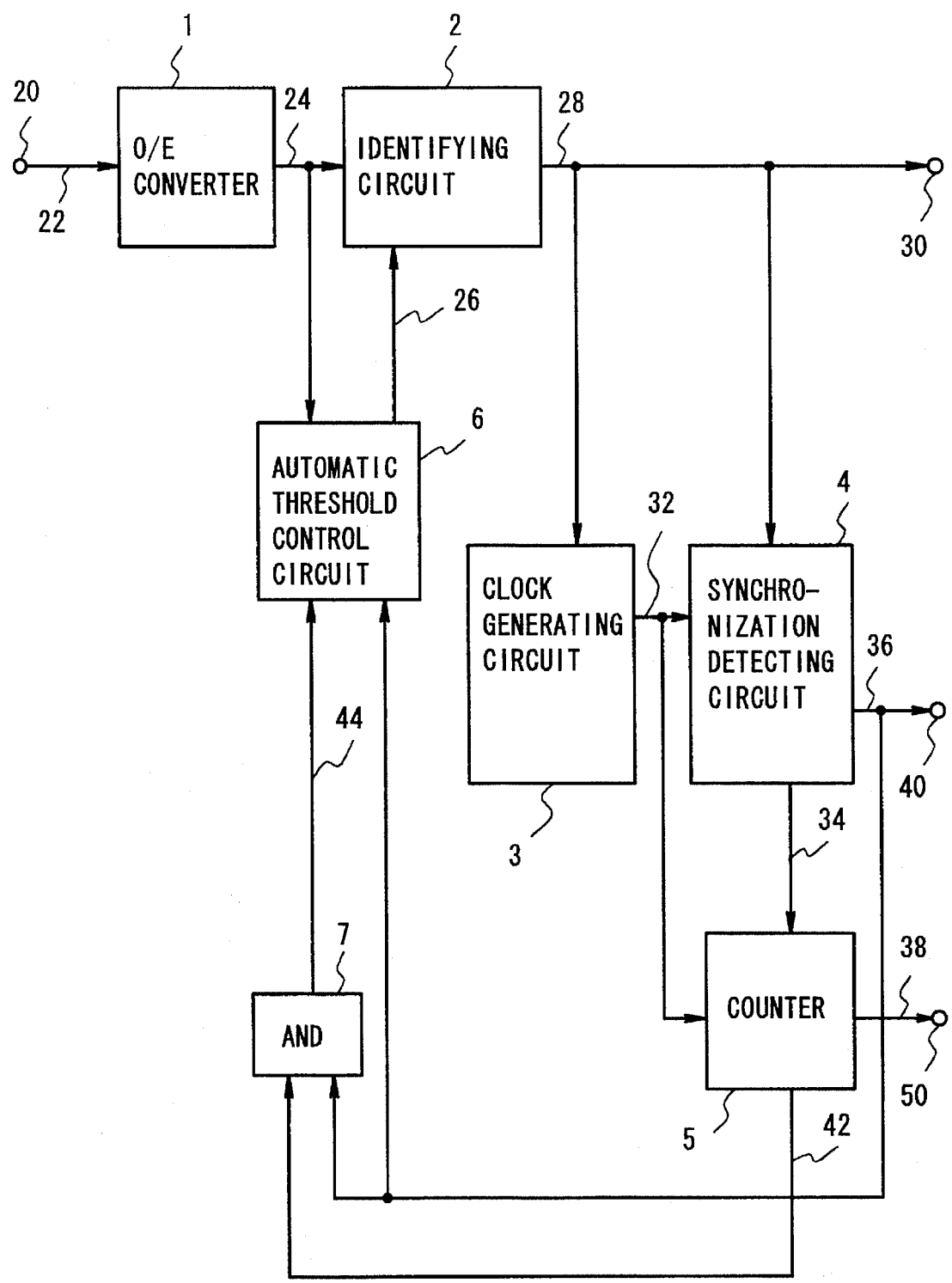
FIG. 2 is a block diagram illustrating a burst signal receiving apparatus in an optical digital transmission system according an embodiment of the present invention.

FIG. 2 is a block diagram illustrating the burst signal receiving apparatus according the embodiment of the present invention. Referring to FIG. 2, an optical digital burst signal 22 which is supplied from an optical transmission path (not shown) via an input terminal 20 is converted into an electric digital burst signal 24 by an optical signal— electric signal (O/E) converter 1. An identifying circuit 2 receives the electric digital burst signal 24 from the O/E converter 1 and a DC threshold signal 26 from an automatic threshold control (ATC) circuit 6 to be described later and uses the threshold signal 26 to identify the level of each of bits of the burst signal 24 to produce a digital burst signal 28 which is outputted to an output terminal 30. A clock signal generating circuit 3 generates a Clock signal 32 in synchronous with the digital burst signal 28. The clock signal 32 is used in the apparatus. A synchronization detecting circuit 4 detects a sync pattern of the digital burst signal 28 outputted from the identifying circuit 2 in synchronous with the clock signal 32 to output the detecting result to an output terminal 40 as a sync information 36. Also, the detecting circuit 4 outputs a hunting information 34 indicative of establishment of synchronization if the sync pattern is once detected. A counter 5 is initialized in response to the sync information 36 and counts the clock pulses of clock signal 32 to output the count to an output terminal 50 as a count information. Also, the counter 5 outputs a reset signal 42 when the count reaches a predetermined value corresponding to the frame length of the burst signal 28. The ATC circuit 6 has preset two duration modes. The duration time corresponds to one bit of the burst signal 28 in a short duration mode and corresponds to a time interval while the hunting information is in the significant level, in a long duration mode. The ATC circuit 6 receives the hunting information 36 from the synchronization detecting circuit 4 to select one of the short and long duration modes in accordance with the hunting information 36. The ATC circuit 6 also receives the digital burst signal 24 from the O/E converter 2 to detect a peak level and bottom level of the burst signal 24 and calculates an average value of the peak level and the bottom level to output the threshold signal 26 having the calculated average value to the identifying circuit 2 such that the threshold signal 26 is held for the duration time determined in the selected duration mode. An AND circuit 7 receives the hunting information 36 from the synchronization detecting circuit 4 and the reset signal 42 from the counter 5 and outputs a threshold signal reset signal 44 to the ATC circuit 6 if the reset signal 42 is inputted when the hunting signal 36 is significant. When receiving the threshold signal reset signal 44, the ATC circuit 6 is reset such that the ATC circuit 6 receives the burst signal 24 for a time corresponding to 3 bits of the burst signal 24 in the embodiment to determine the average value. Then, the ATC circuit 6 outputs the threshold signal 26 to the identifying circuit 2 again.

Next, in operation, an optical digital burst signal 22 is inputted from each of the plurality of child stations to the input terminal 20 of the parent station in time divisional manner. The optical digital burst signal is composed of frames and each frame includes a head bit pattern used for identifying the head of the burst signal, a sync bit pattern as a sync information, and a data bit pattern indicative of data. The burst signals transmitted from the plurality of child stations are different from each other in signal level by transmission losses due to the difference in transmission path length.

In an asynchronous state before a burst signal is received in the parent station, that is, in a state in which a reception prediction phase of the burst signal is not yet determined, since the synchronization detecting circuit 4 does not yet detect any sync pattern, it outputs the hunting information of an insignificant level indicative of the asynchronous state. In this state, the counter 5 runs freely. The AND circuit 7 receives the hunting information of the insignificant level from the synchronization detecting circuit 4 to mask the reset signal 42 outputted from the counter 5. As a result, the threshold signal reset signal 44 is not outputted to the ATC circuit 6. For this reason, the ATC circuit 6 determines the threshold voltage level of the threshold signal 26 when the burst signal 24 is supplied in such a state. Also, the threshold signal 26 is selected in accordance with the hunting information 36 of the insignificant level to have the short duration time as a short continuous zero endurance time. Accordingly, in the asynchronous state before the first burst signal 24 is inputted, the threshold voltage level of the threshold signal 26 is set to a predetermined off-set level, i.e., 0.2 to 0.3V in this embodiment. Thus, even if the first burst signal having any peak voltage level is first inputted to the identifying circuit 2, the head bit pattern can be reliably identified and the subsequent sync bit pattern and data bit pattern can be identified.

Once the identifying circuit 2 identifies a frame of the burst signal, the clock generating circuit 3 generates the clock signal 32 in synchronous with each of the bits of the digital burst signal 28 outputted from the identifying circuit 2. The synchronization detecting circuit 4 detects the sync pattern of the frame of the digital burst signal 28 to output to the counter 5 as the sync information 34. A pulse as the sync information 34 is outputted from the synchronization detecting circuit 4 to the counter 5 each time the sync pattern is detected from each frame of the burst signal. The synchronization detecting circuit 4 also outputs the hunting information of a significant level to the output terminal 40. The hunting information 36 is held at the significant level even if the sync pattern cannot be detected in continuous four frames in this embodiment. That is, even if the sync pattern cannot be detected in the continuous four frames, the sync pattern information already detected is held such that detection error is neglected because the cause of the detection error of the sync pattern cannot be determined. The hunting information 36 is supplied to the ATC circuit 6 and the AND circuit 7 as well as other circuits in the parent station for protection of the data signal in the following stages.

The counter 5 is reset each time the sync information pulse 34 is inputted from the synchronization detecting circuit 4, and then restarts to count the clock signal 32 outputted from the clock generating circuit 3. When the count reaches a predetermined value which is a value slightly shorter than the frame length in units of bits, the counter 5 outputs a reset signal 42 to the AND circuit 7. That is, because the frame length is predetermined, the predetermined value is, for example, (97—head bit pattern length), when the frame length is 100 bits. The counter 5 generates and outputs the reset signal 42 to the AND circuit 7 after a current frame of the burst signal 28 is identified by the identifying circuit 2 such that the sync information pulse 34 is outputted from the synchronization detecting circuit 4, before the next frame of the burst signal 28 is inputted to the identifying circuit 2 by 3 bits. Thus, by presetting the value slightly shorter than the frame length in the counter 5, the reset signal 42 can be outputted immediately before the next frame of the burst signal is received.

The ATC circuit 6 receives the hunting information 36 of the significant level to select the long duration time. Then, the ATC circuit 6 outputs to the identifying circuit 2 the threshold signal 26 indicative of the threshold level already determined and having the long duration time for current frame of the burst signal 24. A rest signal 42 is outputted from the counter 5 to the AND circuit 7 after a given bit length, before the next frame of the burst signal is inputted. The AND circuit 7 outputs the threshold signal reset signal 44 to the ATC circuit 6 in response to the reset signal 42. In response to the threshold signal reset signal 44, the ATC circuit 6 is reset and determines a new average value as the threshold level. The threshold signal 26 indicative of the new threshold level is again held for the long duration time because the hunting information 36 is held at the significant level. When the sync bit pattern of the next frame of the burst signal is detected by the synchronization detecting circuit 4, the counter 5 is reset in response to the sync information 34 from the circuit 4 and then restarts to count the clock signal 32. In this manner, the operation is repeated.

In a case where the sync pattern is not detected, if the sync pattern is once detected within four frames, the threshold signal 26 is held. Therefore, the data bit pattern of the burst signal can be identified with no problem.

In a case where the sync pattern is not detected over more than four frames of the burst signal, the hunting information is reset to the insignificant level. As a result, the ATC circuit 6 determines the threshold level and then outputs to the identifying circuit 2 the threshold signal 26 of the determined threshold level having the short duration time.

In this manner, according to the present invention, when the sync bit pattern is not yet detected, the threshold signal 26 of a short duration time of one bit is outputted, and when the sync bit pattern is once detected, the threshold signal 26 is held while the hunting information 36 is held in the significant level. In this case, however, since the ATC circuit 6 is reset when the next sync bit pattern is detected, the duration time of the threshold signal becomes substantially about one frame. In this manner, the ATC circuit 6 has the two duration times. Since the threshold signal of the short duration time is supplied to the identifying circuit 2, the burst signal can be correctly identified even if the burst signal has any peak level. Further, since the threshold signal of the long duration time is supplied to the identifying circuit 2 once the sync bit pattern is detected, so that the threshold level is held at not the low off-set level but a high level, the identifying circuit 2 does not erroneously operate even if a pulsed noise is introduced on the transmission path.

What is claimed is:

1. A digital burst signal receiving apparatus, comprising:

an identifying circuit for identifying based on a supplied threshold signal whether each of bits of a received digital burst signal is in a high level or a low level;

synchronization detecting means for detecting a sync pattern from said digital burst signal identified by said identifying circuit to produce a hunting signal; and automatic threshold control means for supplying to said identifying circuit said threshold signal indicative of a threshold level which is determined by said automatic threshold control means from the received digital burst signal and having one of first and second duration times which is selected by said automatic threshold control means based on whether said hunting signal is significant or insignificant, the first duration time being longer than the second duration time.

2. A digital burst signal receiving apparatus according to claim 1, wherein the first and second duration times are predetermined, said automatic threshold control means supplies to said identifying circuit the threshold signal having the first duration time when said hunting signal is insignificant and the threshold signal having the second duration time when said hunting signal is significant.

3. A digital burst signal receiving apparatus according to claim 2, wherein the digital burst signal is composed of at least one frame which is composed of a plurality of bits, each frame including a head indication pattern, the sync pattern, and a data pattern, and wherein the first duration time is a time interval of one bit and the second duration time is a time interval of one frame.

4. A digital burst signal receiving apparatus according to claim 2, wherein the digital burst signal is composed of at least one frame which is composed of a plurality of bits, each frame including a head indication pattern, the sync pattern, and a data pattern, and wherein said synchronization detecting means holds the hunting signal in a significant state even if the sync pattern is not detected in at least two continuous frames.

5. A digital burst signal receiving apparatus according to claim 1, further comprising resetting means for resetting said automatic threshold control means such that a new threshold signal determined based on a predetermined offset level is supplied to said identifying circuit.

6. A digital burst signal receiving apparatus according to claim 5, wherein said resetting means includes:

a counter for counting the number of bits of the digital burst signal identified by said identifying circuit after the sync pattern is detected by said synchronization detecting means and generating a reset signal when the count reaches a predetermined value; and signal generating means for generating a threshold signal resetting signal in response to the reset signal from the counter when said hunting signal is in the significant state, and wherein said automatic threshold control means determines the threshold level of the threshold signal based on a predetermined offset level for a predetermined time interval in response to the threshold signal resetting signal from said signal generating means and holds the threshold signal indicative of the determined threshold level for a duration time determined in accordance with whether the hunting signal is significant or insignificant.

7. A digital burst signal receiving apparatus according to claim 6, wherein the digital burst signal is composed of at least one frame which is composed of a plurality of bits, each frame including a head indication pattern, the sync pattern, and a data pattern, and wherein said predetermined value is less than the number of bits contained in one frame.

8. A method of receiving an optical digital burst signal in an optical communication system, comprising the steps of:

converting an optical digital burst signal into an electric digital burst signal;

determining a threshold level from the electric digital burst signal;

identifying based on a threshold signal having the determined threshold level whether each of bits of the electric digital burst signal is in a high level or a low level;

detecting a sync pattern from said electric digital burst signal to produce a hunting signal; and selecting one of first and second duration times as a duration time of the threshold signal based on whether said hunting signal is significant or insignificant, the first duration time being longer than the second duration time.

9. A method according to claim 8, wherein the first and second duration times are predetermined, said selecting step includes:

selecting the first duration time when said hunting signal is insignificant; and selecting the second duration time when said hunting signal is significant.

10. A method according to claim 9, wherein the digital burst signal is composed of at least one frame which is composed of a plurality of bits, each frame including a head indication pattern, the sync pattern, and a data pattern, and wherein the first duration time is a time interval of one bit and the second duration time is a time interval of one frame.

11. A method according to claim 8, wherein the digital burst signal is composed of at least one frame which is composed of a plurality of bits, each frame including a head indication pattern, the sync pattern, and a data pattern, and holding the hunting signal in a significant state even if the sync pattern is not detected in at least two continuous frames.

12. A method according to claim 8, further comprising the step of resetting the threshold signal for a predetermined time interval to determine the threshold level of the threshold signal based on a predetermined offset level.

13. A method according to claim 12, wherein said resetting step includes:

counting the number of bits of the electric digital burst signal after the sync pattern is detected and generating a reset signal when the count reaches a predetermined value; and generating a threshold signal resetting signal in response to the reset signal when said hunting signal is in the significant state, and wherein the threshold level of the threshold signal is determined based on a predetermined offset level in response to the threshold signal resetting signal, the threshold signal indicative of the determined threshold level being held for a duration time determined in accordance with whether the hunting signal is significant or insignificant.

14. A method according to claim 13, wherein the digital burst signal is composed of at least one frame which is composed of a plurality of bits, each frame including a head indication pattern, the sync pattern, and a data pattern, and wherein said predetermined value is less than the number of bits contained in one frame.

15. An apparatus for receiving a digital burst signal composed of frames each of which is composed of a plurality of bits and includes a head pattern, a sync pattern and a data pattern, comprising:

an identifying circuit for identifying based on a supplied threshold signal whether each of bits of a received digital burst signal is in a high level or a low level; and threshold signal control means for determining a threshold level from the received digital burst signal and supplying to said identifying circuit the threshold signal indicative of the determined threshold level and for holding the threshold signal for a first duration time when any sync pattern is detected, and for a second duration time after a sync pattern is detected in a frame until the next frame is received, the first duration time being longer than the second duration time.

16. An apparatus according to claim 15, wherein the first duration time is an time interval of one bit and the second duration time is an time interval of one frame.

17. An apparatus according to claim 2, wherein said threshold signal control means holds the threshold signal for the second duration time even if the sync pattern is not detected in at least two continuous frames when the sync pattern is once detected.

18. An apparatus according to claim 15, further comprising resetting means for resetting said threshold signal control means such that a new threshold signal indicating a threshold level determined based on a predetermined offset level is supplied to said identifying circuit.

19. A digital burst signal receiving apparatus according to claim 5, wherein said resetting means includes:

a counter for counting the number of bits of the digital burst signal identified by said identifying circuit after the sync pattern is detected and generating a reset signal when the count reaches a predetermined value; and signal generating means for generating a threshold signal resetting signal in response to the reset signal from the counter when the sync pattern is once detected; and automatic threshold control means for determining the threshold level for a time other than the first and second duration times and for supplying to said identifying circuit said threshold signal indicative of the determined threshold level which is determined from the received digital burst signal such that the threshold signal is held for the second duration times.

* * * * *